May 20, 1941.    J. H. GREEN ET AL    2,242,465

AUTOMATIC EXHAUST, GAS FILLING, AND OPERATING CIRCUIT CONTROL

Filed Dec. 30, 1938    2 Sheets-Sheet 1

INVENTOR
J. H. GREEN.
G. H. ST. JOHN.
BY
ATTORNEY

May 20, 1941.  J. H. GREEN ET AL  2,242,465
AUTOMATIC EXHAUST, GAS FILLING, AND OPERATING CIRCUIT CONTROL
Filed Dec. 30, 1938  2 Sheets-Sheet 2

INVENTOR
J. H. GREEN
G. H. ST. JOHN.
BY
ATTORNEY

Patented May 20, 1941

2,242,465

UNITED STATES PATENT OFFICE 2,242,465

AUTOMATIC EXHAUST, GAS FILLING, AND OPERATING CIRCUIT CONTROL

James H. Green, West Orange, and George H. St. John, Bloomfield, N. J., assignors to Westinghouse Electric & Manufacturing Company, East Pittsburgh, Pa., a corporation of Pennsylvania Application December 30, 1938, Serial No. 248,400

14 Claims. (Cl. 176—2)

This invention relates to apparatus for automatically controlling the exhaustion and gas-filling of electrical devices, such as gas-filled lamps, rectifiers and other electrical or discharge devices, and more particularly, to means whereby such devices are automatically evacuated, flushed and filled with a gas at a predetermined pressure and, during the manufacturing operations, the seasoning or operating current thereto is controlled without manual adjustment.

The principal object of our invention, generally considered, is the substitution of automatic control for hand processing of gas-filled devices, such as discharge lamps and rectifiers.

Another object of our invention is to secure uniformity in the production, and reduction in shrinkage, when manufacturing gas-filled electrical discharge devices.

A further object of our invention is the control of the exhaust schedule used in the manufacture of "rectigons," and other gas-filled electrical devices, whereby all the operator needs to do, with the exception of the baking which requires some manual attention, is to insert the exhaust tubes of the devices into the exhaust rubbers, make the cathode and anode connections, then push a button, and the machine will then exhaust, flush and fill to a predetermined pressure, while making the necessary circuits and controlling the current therethrough, until the devices are finally treated and filled with gas at the desired pressure, whereupon the operator merely needs to tip-off to complete the process.

Other objects and advantages of the invention, relating to the particular arrangement and construction of the various parts, will become apparent as the description proceeds.

Referring to the drawings illustrating our invention:

Figure 1:
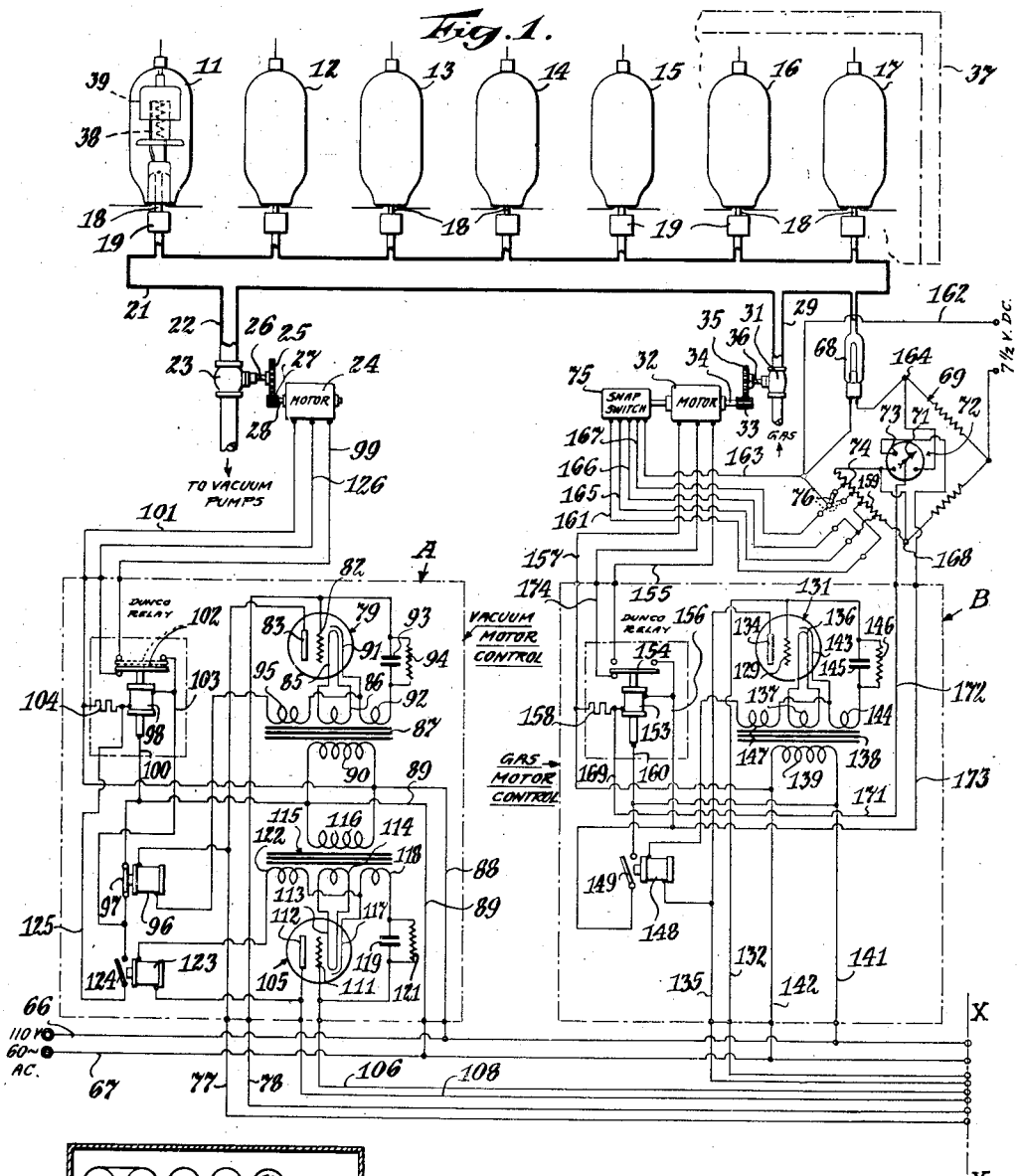
Figure 1 is a diagrammatic view showing a series of rectifier tubes, generally called "rectigons," on an exhaust manifold, and apparatus with associated circuits for exhausting and gas-filling automatically, and connections to said circuits.
Figure 3:
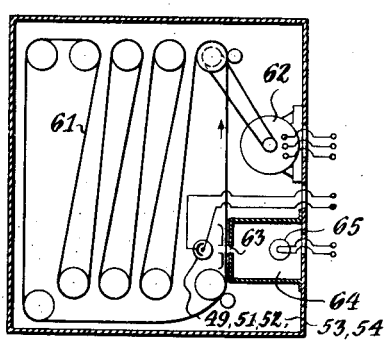
Figure 3 is a diagrammatic view showing the sequence timer, including the means for operating the templet shown in Figure 2.

Referring to the drawings in detail, like parts being designated by like reference characters, there is shown a series of tubes 11 to 17, inclusive, in the present embodiment represented as rectigons," although the apparatus is adapted for manufacturing other gas-filled electrical discharge devices. Each of the tubes or bulbs has an exhaust tube 18 fitted in an exhaust rubber 19 of the vacuum and gas-filling manifold 21.

The manifold 21 has a pipe 22 leading thereto, and controlled by a valve 23 operated by a motor 24 as by means of a wheel 25 on the valve stem 26 meshing with a pinion 27 on the armature shaft 28. This motor is operated by apparatus and control circuits generally designated as A, which will be subsequently described, so that it opens and closes the valve 23 at intervals, to effect the desired exhausting operations for predetermined periods of time.

The manifold 21 also has a gas admission pipe 29 controlled by a valve 31 operated by motor 32. The motor 32 opens and closes the valve through engagement between a pinion 33 on its armature shaft 34 and a wheel 35 on the valve stem 36. The apparatus and circuits generally designated as B, controlling the opening and closing of the gas inlet valve 31, in accordance with the desired pressure, will be subsequently described.

During evacuation, the devices 11 to 17, inclusive, are baked in an oven designated by the reference character 37, said oven being so mounted that it may be lowered over the tubes during the baking operation and raised thereabove after said operation is completed.

Each "rectigon" is in the present embodiment shown as comprising a hot cathode 38 and an anode 39. During certain of the processes, to be hereinafter described, the cathodes are heated to the proper temperature as by connections to secondary windings 41 to 47, inclusive, of transformer 48, and the current passing through each filamentary cathode is controlled by apparatus and circuits generally designated by the reference character C, to be described more fully hereinafter.

During certain of the processes of manufacturing the devices 11 to 17, inclusive, a discharge current is passed therethrough in series, the initiation and intensity of said current being controlled by apparatus and circuits generally designated by the reference character D, to be described more fully hereinafter.

In order to effect the operation of the various parts of the apparatus at the proper time, we provide five photo-cells, 49, 51, 52, 53 and 54, operated at the proper times by light emitted from slits 55 to 59, inclusive, in a templet 61, which is moved as by means of a motor 62 of the synchronous type, past an opening or aperture 63 in a compartment 64 enclosing a lamp or other source of actuating light 65. The cells 49 and 51 operate through apparatus A to respectively open and close vacuum valve 23, the cell 52 operates through apparatus B to open the gas valve 31, the cell 53 operates through apparatus C to close and control the circuit through the filaments, and the cell 54 operates through apparatus D to close and control the plate circuit.

The steps in the exhaust schedule contemplated for the apparatus, such as the "rectigons" 11 to 17, inclusive, which steps are automatically controlled by the apparatus mentioned to the extent indicated, are as follows:

1. The operator takes each "rectigon," or other discharge device to be manufactured, and inserts the tube 18 thereof into the appropriate exhaust rubber 19 in order to connect it to the manifold 21.

2. The lead wires to the cathodes 38 and anodes 39 are then connected to the source of current, originating at the line connections 66 and 67, and shown in the present embodiment as 110 volts, 60 cycles, A. C., so that the cathodes 38 may be heated from the secondary windings of the transformer 48 and a discharge current may pass from said cathodes to the anodes, in series through all the tubes by virtue of the connections shown in Figure 2.

Figure 2:
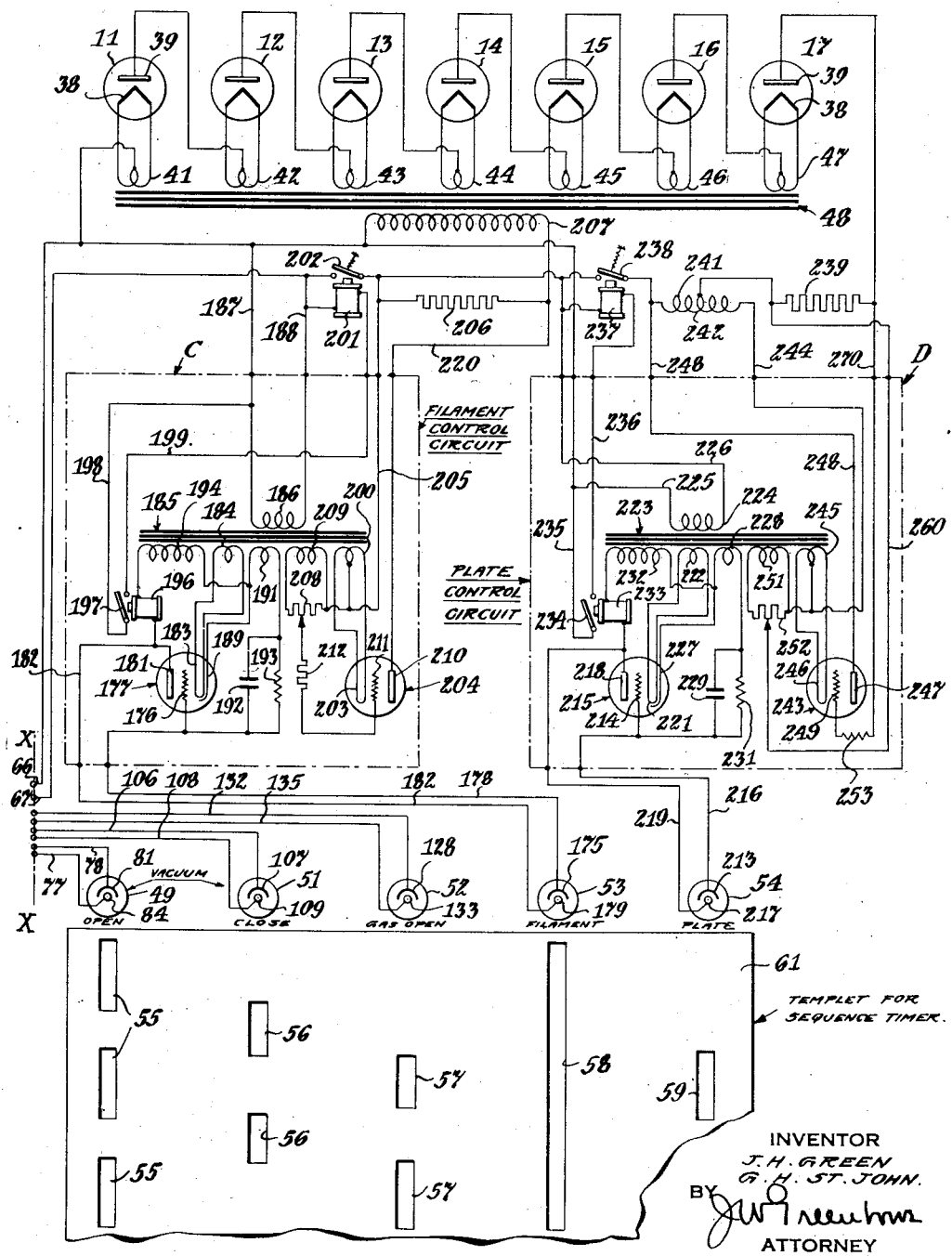
Figure 2 is a view supplementing Figure 1, insofar as circuits are concerned, as indicated by the common line x—x on both figures indicating the place of connection between the conductors thereof, showing the wiring connections to the "rectigons," illustrated in Figure 1, and the templet used in connection with the sequence timer.

3. After the tubes have been connected as shown in Figure 2, the operator starts the timer by pushing a button or closing a switch to operate the motor 62, causing the control templet to be moved along so that the slits 55 to 59, inclusive, transmit light to actuate the cells 49, 51, 52, 53, and 54, in the desired order. The first operation will be the actuation of the photo-cell 49, to open the valve 23 and exhaust the "rectigons" 11 to 17, inclusive, to the desired extent, that is, for example, to two microns or better.

4. The oven 37 is then lowered over the "rectigons" in order to bake the tubes thereof, at temperatures gradually increasing to 500° C. over a period of ten to fifteen minutes, after which the oven is raised and the tubes allowed to cool.

5. The movement of the templet 61 now actuates the photo-cell 53 to light the filaments 38 by means of control apparatus C.

6. Further movement of the templet 61 brings a slit 56 into registry with the opening 63 to operate cell 51 and close the exhaust valve 23, and then a slit 57 into registry with said opening to operate cell 52 and open the gas valve 31, flushing the tubes to a pressure of 13 or about 13 mm. of argon.

7. When the desired argon pressure has been reached, the gas valve 31 is shut off by means of the decreased resistance of the filament in the Pirani gauge 68 balancing the Wheatstone bridge 69, causing the hand 71 of the milliammeter type relay 72 to move counter-clockwise over its dial and engage contact 73 to complete a circuit, cause the motor to reverse, and close the valve 31.

8. A further movement of the templet 61 brings a slit 59 into registry with the opening 63 to operate cell 54 and turn on the plate current which causes a discharge through the "rectigons" 11 to 17, inclusive, in series, by causing control apparatus D to operate.

9. After the plate current has been on for thirty or about thirty seconds, as will be determined by having a slit 59 in the templet 61 of a length corresponding with the movement of the templet during thirty seconds, it is then turned off by passage of the end of the slit beyond the light opening 63. For example, if the templet is operated at a speed of 2" per minute, then the slit 59 will be 1" long.

10. A further movement of the templet 61 brings another slit 55 into registry with the light passage 63, causing the photo-cell 49 to again actuate the motor 24 and open the valve 23, exhausting the "rectigons" 11 to 17, inclusive, to a pressure of one micron or better. When this has been effected, the slit 55 passes beyond the light aperture 63 and the next slit 56 comes into registry with said light aperture, actuating the photo-cell 51 to cause the same apparatus A to operate the motor 24 to close the valve 23 and cut off the vacuum system from the rectigons 11 to 17, inclusive.

11. Further movement of the templet 61 brings another slit 57 into registry with the light aperture 63, causing the photo-cell 52 to again operate the motor 32 to flush the tubes 11 to 17, inclusive, with argon to a pressure of six or about six millimeters. This change of filling pressure is effected by virtue of a new and increased setting of the resistance 74, caused by the snap switch 75 having been turned by the motor 32, so that the Pirani tube 68 is balanced sooner than previously and, therefore, operates quicker to turn off the gas control valve 31.

12. A still further movement of the templet 61 brings another slit 59 into registry with the opening 63 to again operate cell 54, and through apparatus D, turn on the plate current, which again causes a discharge through the "rectigons" 11 to 17, inclusive. This time the current is allowed to operate for seventy-five or about seventy-five seconds, as will be determined by the length of the slit 59 after which it is turned off.

13. The templet 61 then brings another slit 55 into registry with the light passage 63, causing the photo-cell 49 to again actuate the motor 24, through apparatus A, and open the valve 23, exhausting the "rectigons" 11 to 17, inclusive, to a pressure of ½ micron or better. When this has been effected, the slit 55 passes beyond the light aperture 63, and the next slit 56 comes into registry with said light aperture, actuating the photo-cell 51 to cause the same apparatus A to operate the motor 24 to close the valve 23 and cut off the vacuum system from the tubes 11 to 17, inclusive.

14. Additional movement of the templet 61 brings another slit 57 into registry with the light aperture 63, causing the photo-cell 52 to again operate the motor 32 to flush the tubes 11 to 17, inclusive, with argon to a pressure of six or about six millimeters, as heretofore, it being noted that even though the snap switch 75 has been turned another notch, the resistance 74 is still maintained in the same setting so that the Pirani tube is balanced after the same length of time, as previously, and on operating to turn off the gas-emitting valve 31 leaves the filling as at the desired pressure.

15. Further movement of the templet 61 brings another slit 59 into registry with the opening 63 to again operate cell 54, and turn on the plate current which causes a discharge through "rectigons" 11 to 17, inclusive. This discharge is allowed to continue for one hundred and twenty or about one hundred and twenty seconds, as will be determined by the length of the slit 59.

16. Before the present slit 59 has passed beyond the light aperture 63, another slit 55 comes into registry with said light aperture, causing the photo-cell 49 to again actuate the motor 24 and open the exhaust valve 23. After this exhausting operation has been continued for five seconds, or about five seconds, the slit 59 passes beyond the light aperture 63 to turn off the plate current supply.

17. The slit 55 is of such a length that the "rectigons" 11 to 17, inclusive, are evacuated to one half micron or less when said slit 55 passes beyond the light aperture 63. Then a slit 56 passes over said aperture to effect actuation of the photo-cell 51 and closure of valve 23, thereby effecting a final evacuation of the "rectigons" 11 to 17, inclusive.

18. Further movement of the templet 61 causes the slit 58 to pass beyond the light aperture 63 thereby shutting off the filaments 38 in the tubes and allowing said tubes to cool.

19. The next slit is one of the series 57 which energize the cell 52 and causes the motor 32 to open the valve 31 to allow the final fill gas to flow to the "rectigons" 11 to 17, inclusive. The pressure of the gas is determined by the type of "rectigons" being manufactured, that is, sixty-five millimeters is used for low voltage "rectigons," and seventy-five millimeters for high voltage "rectigons." If, for example, the former are being manufactured, the switch 76 is moved from the position indicated in full lines to that shown in dotted lines in Figure 1, to correspondingly increase the resistance 74 to make the motor 32 shut off the valve 31 when a pressure of sixty-five millimeters or about sixty-five millimeters of argon is obtained. If, however, high voltage "rectigons" are being manufactured, the switch 76 is left as shown in full lines, whereupon the valve 31 is left open for a correspondingly longer time or until a pressure of seventy-five millimeters is obtained. The change from the previous setting of six millimeters is, of course, effected by a further turn of the snap switch 75.

20. When the desired pressure, in accordance with the setting of the switch 76, has been obtained in the "rectigons" 11 to 17, inclusive, the motor 32 shuts the valve 31 leaving said "rectigons" ready for sealing off, which is accordingly effected in the usual manner.

The foregoing explanation of how an exhaust schedule may be made automatic will now be supplemented by a description of how the apparatus, respectively designated as A, B, C, and D, works.

First considering apparatus A which effects the operation of the motor 24 to turn on or off the vacuum valve 23, we find that it is connected to the controlling photo-cell 49 for opening movement of the valve 23 by conductors 77 and 78 which lead directly to the relay tube 79. The cathode 81 of the photo-cell 49 is connected to the grid 82 of the tube 79 by means of said conductor 78. The plate 83 of the tube 79 is, therefore, connected to the anode 84 of the photo-cell 49 by means of conductor 77. The cathode heating filament 85 of the tube 79 is energized from a secondary winding 86 of transformer 87, the primary 90 of which is connected to the line conductors 66 and 67 by conductors 88 and 89 respectively. The grid 82 is biased with respect to the cathode 91 by means of secondary winding 92 connected thereto through a condenser 93 and grid leak 94.

In operation, when the cathode 81 of the cell 49 starts to emit electrons upon the impingement of light thereon, the tube 79 passes more plate current induced by secondary winding 95 of the transformer 87 causing the winding of the relay magnet 96 to draw the armature 97 thereof, to close a circuit from the line conductors 66 and 67 through conductors 88 and 89, winding of Dunco relay magnet 98 and "open" lead conductor 99 to motor 24.

The operating circuit to the motor 24 for opening movement of the valve 23 is from line conductor 66, through conductor 88, to "common" lead 101, through motor 24, through lead 99, Dunco relay armature 102, lead 103, relay armature 97, and lead 89 to line conductor 67. The armature 102 is kept in its uppermost position during this operation, by current from lead 88, through resistance 104, magnet winding 98, lead 103, relay armature 102, conductor 100, and back to line 67 through conductor 89.

Apparatus A is also connected to the photo-cell 51 for effecting closing movement of the valve 23. This photo-cell is connected to the relay tube 105 by conductor 106 from its cathode 107, and conductor 108 from its anode 109, the cathode 107 being, as in the previous instance, connected to the grid 111, and the anode connected to the plate 112. The cathode heating filament 113 of the tube 105, is energized from a secondary winding 114 of transformer 115, the primary 116 of which is connected to the line conductors 66 and 67 by conductors 88 and 89, respectively. The grid 111 is biased with respect to the cathode 117 by means of secondary winding 118 connected thereto through a condenser 119 and grid leak 121.

In operation, when the cathode 107 of the cell 51 starts to emit electrons upon the impingement of light thereon, the tube 105 passes more plate current induced by secondary winding 122 of the transformer 115, causing the winding of relay magnet 123 to draw the armature 124 thereof to short circuit the winding of the Dunco relay magnet 98 through conductors 103 and 125. This allows the armature 102 of said magnet to drop from its uppermost position, opening the circuit through the "open" lead 99 and closing the circuit through the "close" lead 126.

The operating circuit to the motor 24 for closing movement of the valve 23 is from line conductor 66 through conductor 88 to "common" lead 101, motor 24, "close" lead 126, armature 102, conductor 100, and back to line 67 through conductor 89.

Apparatus B is operated for opening the gas valve 31 in a similar manner. The cathode 128 of the controlling photo-cell 52 is connected to the grid 129 of relay tube 131 by means of conductor 132, and the anode 133 of the cell 52 is connected to the plate 134 of said tube 131 by means of conductor 135. The cathode heating filament 136 of the tube 131 is energized from a secondary winding 137 of transformer 138, the primary 139 of which is connected to the line conductors 66 and 67 by conductors 141 and 142, respectively. The grid 129 is biased with respect to the cathode 143 by means of secondary winding 144 connected thereto through a condenser 145 and grid leak 146.

In operation, when the cathode 128 of the tube 52 starts to emit electrons upon the impingement of light thereon the tube 131 passes more plate current induced by secondary winding 147 of the transformer 138, causing the winding of relay magnet 148 to draw the armature 149 thereof to close a circuit from the line conductors 66 and 67 through conductors 141 and 142 and winding of Dunco relay magnet 153 to raise the armature 154 thereof and close circuit through "open" lead 155 to motor 32.

The operating circuit to the motor 32 for opening movement of the valve 31 is from line conductor 66 through conductor 141, relay armature 149, lead 156, armature 154, "open" lead 155, motor 32, "common" lead 157, and back to the line 67 through conductor 142. The armature 154 is kept in its uppermost position during this operation by current from lead 142, through resistance 158, magnet winding 153, lead 156, relay armature 154, conductor 160, and back to line 66 through conductor 141.

Apparatus B is also operated for closing the gas valve 31 when the gas in the manifold 21, as measured by the Pirani tube 68, reaches a predetermined pressure. Inasmuch as the schedule described requires pressures some of which are different, means are necessarily provided for changing the setting of the resistance 74 during the exhausting, flushing and filling operations, so that balancing of the Wheatstone Bridge 69 is effected when the desired pressures are obtained, in accordance with the schedule, and the valve 31 closed.

The adjustment of the resistance 74 for different values, in accordance with the different pressures desired, may be effected by the snap switch 75 which is turned a quarter of a revolution, each time the motor 32 operates to open the valve 31, to effect the desired changes in the resistance to balance against that of the Pirani tube filament. The setting, in the present instance, is such that during the first opening movement of the motor 32, the snap switch 75 effects a cutting out of the lower resistance section 159 through its lead 161. The circuit during that part of the flushing operation previously described in paragraph numbered 6, is preferably from a 7.5 volt D. C. line conductor 162 through "common" conductor 163, snap switch 75, conductor 161, the remainder of resistance 74, and milliammeter relay 72 to the other corner 164 of the Wheatstone bridge 69. In other words, the resistance 74 is so adjusted that the resistance of the filament in the Pirani tube 68 balances therewith when a pressure of 13 mm. of argon is in the manifold 21.

The subsequent flushing or gas-filling steps are the same as that previously traced, except that for a pressure of 6 mm. of argon, the snap switch selects conductor 165, and then conductor 166 upon said switch being turned another quarter of a revolution. Upon turning still another quarter of a revolution, the switch selects conductor 167 which cuts out still more to cause the resistance 74 to balance that of the filament in the Pirani tube 68 when the pressure of argon is 65 or 75 mm., depending on whether the setting of the switch 76 is as shown in dotted lines or in full lines.

In the operation of closing the valve 31 upon the Pirani tube 68 balancing the resistance 74, say in the first setting of the snap switch 75, that is, when the pressure in the manifold reaches 13 mm. of argon, current from the 7.5 volt D. C. source flows through the conductor 162 to one corner of the Wheatstone bridge 69, where it divides and exactly one half flows through the filament of the Pirani tube 68 to the corner 164 of said bridge.

The other half of the current flows through the "common" conductor 163, snap switch 75, conductor 161, adjusted resistance 74, that is the part of said resistance after the lower end section 159 has been cut out, and back to the other corner 168. Inasmuch as this makes equal the potentials at the corners 164 and 168, no current flows through the milliammeter relay 72, so that the hand 71 thereof drops back to contact point 73, thereby short circuiting the Dunco relay magnet winding 153 through conductor 169, conductor 171, conductor 172, conductor 173 and conductor 156. This allows the armature 154 of said magnet to drop from its uppermost position, opening the circuit through the "open" lead 155 and closing the circuit through the "close" lead 174.

The operating circuit to the motor 32 for closing movement of the valve 31 is from line conductor 66, through conductor 141, armature 154, "close" lead 174, motor 32, "common" lead 157 and back to line 67 through conductors 157 and 142. The circuits for each of the other adjustments of the snap switch are identical with those previously discussed, except that conductor 165, 166 or 167 is used instead of conductor 161.

Apparatus C for controlling the rectigon filament circuit, is operated by the photo-cell 53, the cathode 175 of said cell being connected to the grid 176 of relay tube 177 through conductor 178, and the anode 179 of said cell being connected to plate 181 by means of conductor 182. The cathode heating filament 183 of the tube 177 is energized from a secondary winding 184 of transformer 185, the primary 186 of which is connected to the line conductors 66 and 67 by conductors 187 and 188, respectively. The grid 176 is biased with respect to the cathode 189 by means of secondary winding 191 connected thereto through a condenser 192 and grid leak 193.

In operation, when the cathode 175 of the cell 53 starts to emit electrons, upon the impingement of light thereon, the tube 177 passes more plate current induced by secondary winding 194 of the transformer 185, causing the winding of relay magnet 196 to draw the armature 197 thereof to close a circuit through conductors 198 and 199, from conductors 187 and 188, respectively, through the winding of relay magnet 201, to move the armature 202 thereof to close the circuit to the primary winding 207 of the filament heating transformer 48, and connect the midpoint of the secondary winding 200 for the filament 203 of thyratron 204 to line 67, through conductor 205. The plate 210 of the thyratron 204 is connected to the controlled circuit between the resistance 206 and the primary 207 by conductor 220. The thyratron grid 211 is actuated by variations in the line feeding the primary 207 of said filament transformer 48 through conductors 187 and 188.

The resistance 208 across the secondary 209 adjustably connected to the grid through the resistance 212, controls the potential of the grid 211, and is set so as to be just below the blocking point of the tube 204. This means that the plate current through the tube 204 is in parallel with that through the resistance 206, reducing the effective resistance in series with the primary 207 to a minimum, and allowing a maximum voltage to be applied to said primary winding. The purpose of our filament voltage stabilizer is to guard against an increase in the potential to the filament transformer. If the voltage of the line fluctuates above normal, the bias of the grid 211 becomes more negative with respect to the plate causing the tube 204 to block, thus increasing the effective value of the resistance in series with the primary winding 207 which is then simply the resistance 206, and effecting an adjustment of the filament current by lowering the effective potential thereof.

Apparatus D for controlling the rectigon plate circuit is operated by the photo-cell 54, the cathode 213 of said cell being connected to the grid 214 of relay tube 215 by conductor 216, and the anode 217 of said cell being connected to the plate 218 by means of conductor 219. The cathode heating filament 221 of the tube 215 is energized from a secondary winding 222 of transformer 223, the primary 224 of which is connected to the line conductors 66 and 67 by conductors 225 and 226, respectively. The grid 214 is biased with respect to the cathode 227 by means of secondary winding 228, connected thereto through a condenser 229 and grid leak 231.

In operation, when the cathode 213 of the cell 54 starts to emit electrons upon the impingement of light thereon, the tube 215 passes more plate current induced by secondary winding 232 of the transformer 223, causing the winding of relay magnet 233 to draw the armature 234 thereof, to close a circuit through conductors 235 and 236 from the line conductors 66 and 67, through the winding of relay magnet 237, to move the armature 238 thereof to close the plate circuit to the rectigons 11 to 17, inclusive, through the stabilizing resistance 239 and the low resistance or voltage portion 241 of autotransformer of auto-reactance 242.

A thyratron tube 243 is connected across the high voltage leads of said auto-transformer 242. To accomplish this, conductor 244 connects one side of said high voltage winding of said auto-transformer 242 to the center tap, preferably, of secondary winding 245 which energizes the filamentary cathode 246 of said thyratron 243. The plate 247 of said thyratron is, in turn, connected by conductor 248 to the other high voltage tap of said auto-transformer 242. The thyratron grid 249 is biased with respect to the cathode 246 by secondary 251 of transformer 223, across which is disposed a resistance 252, adjustably coupled to one side of the resistor 239 through conductor 260. The grid 249 is connected through grid leak resistance 253 to resistance 239 through conductor 270. The potential to the grid 249, through grid leak 253, is varied in accordance with the voltage drop through the resistance 239, as the plate current through the rectigons varies.

In order to operate as desired, the current through the rectigons 11 to 17, inclusive, on the exhaust, is set to the proper value for the desired plate bombardment, after which the grid bias on the control tube 243 is set at a relative potential just below the blocking point, that is, so that the tube transmits current which acts as a short circuit across the reactance 242. The voltage drop through the series resistance 239 then acts through the conductors 260 and 270 in such a manner as to make the grid bias more negative and cause the tube 243 to block, when an increase in the current is caused by some condition, either an increase in the line voltage or a decrease in the resistance of the discharge path through the tubes 11 to 17, inclusive.

When the tube 243 blocks or stops discharging, it removes the short circuit or shunt path across the high voltage leads of the reactance 242, and increases the effect of said reactance in series in the rectigon plate circuit, so that the current thereto is effectively controlled to prevent it from reaching excessive values.

From the foregoing disclosure, it will be seen that we have provided a method and apparatus for automatically initiating and controlling the exhausting and gas-filling steps, as well as the operating currents used during the manufacture of discharge devices. Although the disclosure is specifically with regard to the making of rectigons, it is obvious that we do not wish to be limited thereto, as our invention is similarly useful, at least to some extent, in the manufacture of any evacuated, gas-filled, or discharge device, as it conserves the operator's time and energy by making at least some of the manufacturing steps automatic, rather than manual.

Further advantages obtained are that the uniformity of the product is improved and shrinkage reduced. Broadly speaking, the equipment desirably employed, consists of a timer which controls the application of current of the proper value and for the desired duration of time, as well as controlling the vacuum and gas systems for evacuating and filling the tubes.

In summary, it might be stated that the apparatus involved in the preferred embodiment of the invention disclosed includes six elements, although in manufacturing some devices, it will be understood that some of the advantages of our invention may be obtained even though all of the elements of the apparatus disclosed are not used. The first, or primary apparatus, is that for connecting and disconnecting, or controlling, the vacuum system. The second, is that for initiating and terminating, or controlling the admission of the fill gas, if used, and the regulation of the gas pressure. The third, is that for initiating, terminating, and controlling the filament or cathode heating current in the devices, if devices including hot cathodes are being manufactured. The fourth is that for controlling the discharge current through the devices, if discharge devices are being manufactured. The fifth, is the templet provided with slits for admitting light to devices, such as photo-electric cells, which initiate and terminate the operation of the previously mentioned tube devices, and the sixth is the timer or templet driver, preferably motor driven, with a clutch drive, and also adapted to be hand operated, so that the templet may be operated at the desired speed. The timer desirably starts upon pushing a button, and automatically stops when the cycle has been completed.

In the preceding description of the apparatus, it will be understood that although a certain type of valve has been shown as employed in the vacuum and gas-filling supply lines, yet other types of valves or stop cocks may instead be effectively employed, as the apparatus is merely illustrative. The motors or other means for operating such valves or stop cocks, are desirably of the limit switch type, that is, when the prime mover operates the valve or cock to fully open position, it automatically shuts off its own power, and the same thing occurs when it reverses and completely closes the valve.

It will also be understood, that although a Pirani tube has been shown for controlling the pressure of the gas with which the devices are filled, another suitable pressure sensitive device may be substituted, if desired. Although a snap switch on the gas valve motor has been illustrated for regulating the resistance in parallel with the Pirani tube filament for controlling the gas pressure, it will be understood that other suitable means may be substituted for this purpose, if desired.

Although a preferred embodiment of our invention has been disclosed, it will be understood that modifications may be made within the spirit and scope of the appended claims.

We claim:

1. Apparatus for exhausting discharge devices comprising a valve controlling a vacuum connection, a motor for opening and closing said valve, a selecting relay for controlling the direction of operation of said motor, a pair of initiating relays for said selecting relay, one of said initiating relays being adapted to close a circuit to operate the selecting relay for causing the motor to turn in one direction and open the valve, and the other relay being adapted to close another circuit to return the selecting relay to initial position and cause the motor to operate in the opposite direction and close the valve, a three-electrode tube for each initiating relay, a photo-electric cell for controlling each three-electrode tube, and means automatically actuating said cells at intervals in accordance with a manufacturing schedule.

2. Apparatus for gas-filling discharge devices comprising a valve controlling the admission of fill gas, a motor for opening and closing said valve, a snap switch actuated by movement of said motor, a selecting relay for controlling the direction of operation of said motor, an initiating relay for said selecting relay to effect opening movement of said valve, a three-electrode tube controlling the operation of said initiating relay, a photo-electric cell for actuating said tube to cause the initiating relay to close, a Wheatstone bridge, a Pirani tube the filament of which is in circuit in one side of said bridge, a resistance in an adjacent side of said bridge, the adjustment of which is controlled by said snap switch, a relay connected to said bridge so that a circuit is initiated thereby when the resistance of the Pirani filament balances said adjusted resistance, in order to return the selecting relay to initial position and effect closing movement of said valve.

3. Apparatus for controlling the cathode heating filament current in discharge devices comprising a transformer with secondaries connected to the filaments of said devices, means for preventing undesired increase in current in said filaments, upon an increase in the voltage applied to the primary of said transformer, comprising a resistance in series with said primary, a three-electrode tube in parallel with said resistance for controlling the effective voltage applied to said primary, means for closing the circuit through said primary and effecting the control thereof, comprising an initiating relay, another three-electrode tube, a relay in the tube plate circuit for effecting closing of said initiating relay, and a photo-electric cell, the electrodes of which are respectively connected to the grid and plate of said tube for closing said last mentioned relay.

4. Apparatus for controlling the anode current of discharge devices comprising anode and cathode connections to a source of power for supplying such current, means for controlling the intensity of said current comprising a resistance and auto-reactance in series with the circuit, a three-electrode tube in parallel with said auto-reactance, means for varying the potential of the tube grid in accordance with the intensity of the discharge to cause the tube to block upon increase in current above normal, means for closing the discharge circuit and putting the control in effect, comprising an initiating relay, the armature of which is adapted to close the line circuit, another relay controlling the circuit to the first mentioned relay, a three-electrode tube controlling the operation of said last mentioned relay, and a photo-electric cell the electrodes of which are respectively connected to the plate and grid of said controlling tube for operating its relay.

5. Apparatus for exhausting, gas filling, and operating discharge devices, comprising a manifold to which said devices are connected through their exhaust tubes, means for controlling the vacuum connection to said manifold, means including a Pirani tube and a Wheatstone bridge for controlling the gas connection to said manifold, means for initiating and controlling the filament heating current of said devices, means for initiating and controlling the discharge current through said devices, photo-electric cells for controlling all of said means, means for controlling the operation of said photo-electric cells in accordance with a manufacturing schedule comprising a templet formed with slits, a source of light associated with said templet, and means for moving said templet to expose the photo-electric cells to said source of light in accordance with said schedule, in order to automatically effect exhausting and gas-filling, initiate and control the filament current, and initiate and control the discharge current through said devices.

6. Apparatus for exhausting and gas filling discharge devices, comprising a manifold to which said devices are connected through their exhaust tubes, a vacuum valve controlling a vacuum connection to said manifold, a vacuum motor for opening and closing said vacuum valve, a selecting relay for controlling the direction of operation of said motor, a pair of initiating relays for said selecting relay, a three-electrode tube for actuating one of said initiating relays for effecting opening movement of said valve, another three-electrode tube for actuating the other of said initiating relays for effecting closing movement of said valve, a pair of photo-electric cells respectively controlling said three-electrode tubes, a gas valve controlling the admission of fill gas to said manifold, a gas motor for opening and closing said gas valve, a snap switch actuated by movement of said gas motor, another selecting relay for controlling the direction of operation of said gas motor, another initiating relay for said selecting relay, in order to effect opening movement of said valve, another three-electrode tube controlling the operation of said initiating relay, another photo-electric cell for actuating said last-mentioned tube to cause its initiating relay to close, a Wheatstone bridge, a Pirani tube, the filament of which is in circuit in one side of said bridge, a resistance in an adjacent side of said bridge, the adjustment of which is controlled by said snap switch, a relay connected to said bridge so that a circuit is initiated thereby when the resistance of the Pirani filament balances said adjusted resistance, in order to return the selecting relay to initial position and effect closing movement of said gas valve, a templet formed with slits arranged in accordance with a given schedule, a source of light associated with said templet, and means for moving said templet to expose all of the photo-electric cells to light coming through said slits, to automatically effect exhausting and gas-filling of said devices.

7. Apparatus for exhausting discharge devices comprising a vacuum connection, a device for opening and closing said connection, selecting means for controlling the direction of operation of said device, initiating means for said selecting means, one of said initiating means being adapted to operate the selecting means for causing the device to open the connection, and another of said initiating means being adapted to return the selecting means to initial position and cause the device to operate in the opposite direction and close the connection, a control tube for each initiating means, and a photo-electric cell for activating each control tube, and means automatically actuating said cells at intervals in accordance with a manufacturing schedule.

8. Apparatus for gas-filling discharge devices comprising a gas-filling connection, a device for opening and closing said connection, resistance-adjusting means actuated by movement of said device, selecting means for controlling the direction of operation of said device, initiating means for said selecting means to effect opening movement of said connection, a control tube for said initiating means, a photo-electric cell for actuating said tube to cause the initiating means to close, a Wheatstone bridge, a pressure-sensitive device in circuit in one side of said bridge, a resistance in an adjacent side of said bridge, the value of which is controlled by said adjusting means, means connected to said bridge so that a circuit is initiated when the resistance of the pressure-sensitive device balances said resistance, in order to return the selecting means to initial position and effect closing of said connection.

9. Apparatus for controlling the filament current in discharge devices comprising a transformer with secondaries connected to the filaments of said devices, means for preventing undesired increase in current in said filaments, upon an increase in the voltage applied to the primary of said transformer, comprising a resistance in series with said primary, a control tube in parallel with said resistance for regulating the effective voltage applied to said primary, means for closing the circuit through said primary and effecting the control thereof, comprising initiating means, another control tube, a relay in the tube plate circuit for effecting closing of said initiating means, and a photo-electric cell, the electrodes of which are respectively connected to the grid and plate of said tube for closing said last mentioned relay.

10. Apparatus for controlling the anode current of discharge devices comprising anode and cathode connections to a source of power for supplying such current, means for controlling the intensity of said current comprising a resistance and auto-reactance in series with the circuit, a control tube in parallel with said auto-reactance, means for varying the potential of the tube grid in accordance with the intensity of the discharge to cause the tube to block upon increase in current above normal, means for closing the discharge circuit and putting the control in effect, comprising another control tube, and a photo-electric cell the electrodes of which are respectively connected to the plate and grid of said control tube for operating said relay.

11. Apparatus for exhausting, gas filling, and operating discharge devices, comprising means for controlling the vacuum connection, means including a Pirani tube and a Wheatstone bridge for controlling the gas connection, means for initiating and controlling the filament heating current of said devices, means for initiating and controlling the discharge current through said devices, photo-electric cells for controlling all of said means, and means for automatically controlling the operation of said photo-electric cells in accordance with a manufacturing schedule, in order to automatically effect exhausting and gas-filling, initiate and control the filament current, and initiate and control the discharge current through said devices.

12. Apparatus for exhausting and gas filling discharge devices, comprising means for controlling the vacuum connection, means including a Pirani tube and a Wheatstone bridge for controlling the gas connection, photoelectric cells for controlling both of said means, and means for automatically controlling the operation of said photoelectric cells in accordance with a manufacturing schedule, in order to automatically effect exhausting and gas filling of said devices.

13. Apparatus for operating discharge devices, comprising means for initiating and controlling the filament heating current of said devices, means for initiating and controlling the discharge current through said devices, photoelectric cells for controlling both of said means, and means for automatically controlling the operation of said photoelectric cells in accordance with a manufacturing schedule, in order to automatically initiate and control the filament current and initiate and control the discharge current through said devices.

14. Apparatus for operating discharge devices, comprising a transformer with secondaries connected to the filaments of said devices for heating them to emission temperature, means for controlling the filament heating current comprising a resistance in series with the primary of said transformer, a three-electrode tube in parallel with said resistance for controlling the effective voltage applied to said primary, means for closing the circuit through said primary and effecting the control thereof, comprising an initiating relay, another three-electrode tube, a relay in the plate circuit of the last-mentioned tube for effecting closing of said initiating relay, another photoelectric cell, the electrodes of which are respectively connected to the grid and plate of said last-mentioned tube for closing said last-mentioned relay, plate and filament connections to a source of power for causing a discharge current to pass through said devices, means for controlling the intensity of said current comprising a resistance and auto-reactance in series with said power source, a thyratron tube in parallel with said auto-reactance, means for varying the potential of the thyratron tube grid, in accordance with the intensity of the discharge, to cause said thyratron tube to block upon increase in current above normal, to prevent excessive discharge, means for closing the discharge circuit and putting the control in effect comprising an initiating relay for closing the line circuit, another relay controlling the circuit to said first-mentioned relay, another three-electrode tube controlling the operation of said last-mentioned relay, a photoelectric cell, the electrodes of which are respectively connected to the plate and grid of said last-mentioned tube for operating its relay, a templet formed with slits arranged in accordance with a given schedule, a source of light associated with said templet, and means for moving the latter to expose said cells to light coming through said slits to automatically initiate and control the filament current, and initiate and control the discharge current through said devices.

JAMES H. GREEN.
GEORGE H. ST. JOHN.